United States Patent
Masuda

(10) Patent No.: US 10,958,496 B1
(45) Date of Patent: Mar. 23, 2021

(54) TRANSMITTER, CONTROL CIRCUIT, RECORDING MEDIUM, AND SUBCARRIER MAPPING METHOD

(71) Applicant: Mitsubishi Electric Corporation, Tokyo (JP)

(72) Inventor: Shinji Masuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/961,069

(22) PCT Filed: Feb. 20, 2018

(86) PCT No.: PCT/JP2018/006026
§ 371 (c)(1),
(2) Date: Jul. 9, 2020

(87) PCT Pub. No.: WO2019/163001
PCT Pub. Date: Aug. 29, 2019

(51) Int. Cl.
*H04L 27/26* (2006.01)
*H04L 5/00* (2006.01)

(52) U.S. Cl.
CPC ........ *H04L 27/2626* (2013.01); *H04L 5/0007* (2013.01)

(58) Field of Classification Search
CPC .................. H04L 27/2601; H04L 27/2627
See application file for complete search history.

(56) References Cited

U.S. PATENT DOCUMENTS

| | | | | |
|---|---|---|---|---|
| 6,882,618 | B1* | 4/2005 | Sakoda | H04L 27/2601 370/208 |
| 2009/0220027 | A1* | 9/2009 | Halfmann | H04L 27/2608 375/308 |
| 2013/0051801 | A1* | 2/2013 | Kuschnerov | H04B 10/50 398/65 |
| 2015/0036698 | A1* | 2/2015 | Umeda | H04L 27/2613 370/503 |
| 2016/0241351 | A1* | 8/2016 | Suzuki | H04J 11/0023 |

FOREIGN PATENT DOCUMENTS

WO  WO 2013/128983 A1  9/2013

OTHER PUBLICATIONS

Tarokh et al., "A Differential Detection Scheme for Transmit Diversity", IEEE Journal on Selected Areas in Communications, vol. 18, No. 7, Jul. 2000, pp. 1169-1174.

* cited by examiner

*Primary Examiner* — Kevin Kim
(74) *Attorney, Agent, or Firm* — Birch, Stewart, Kolasch & Birch, LLP

(57) ABSTRACT

A transmitter includes: a first mapping unit to allocate modulation symbols to orthogonal frequency division multiplexing subcarriers; a first differential block coding unit to perform differential block coding on a part of the modulation symbols allocated; a second differential block coding unit to perform, by using output of the first differential block coding unit as a start symbol, differential block coding on a remaining modulation symbol excluding the part of the modulation symbols subjected to differential block coding by the first differential block coding unit; and a second mapping unit to convert output of the second differential block coding unit into a transmit signal that is transmitted from a plurality of antennas.

10 Claims, 15 Drawing Sheets

| | OS#0 | OS#1 | OS#2 | OS#3 | OS#4 | OS#5 | ... | OS#($N_{OS}$-2) | OS#($N_{OS}$-1) |
|---|---|---|---|---|---|---|---|---|---|
| SC#0 | $s_{0,0}$ | $s_{1,0}$ | $s_{2,0}$ | $s_{3,0}$ | $s_{4,0}$ | $s_{5,0}$ | ... | $s_{N_{OS}-2,0}$ | $s_{N_{OS}-1,0}$ |
| SC#1 | $s_{0,1}$ | $s_{1,1}$ | $s_{2,1}$ | $s_{3,1}$ | $s_{4,1}$ | $s_{5,1}$ | ... | $s_{N_{OS}-2,1}$ | $s_{N_{OS}-1,1}$ |
| SC#2 | $s_{0,2}$ | $s_{1,2}$ | $s_{2,2}$ | $s_{3,2}$ | $s_{4,2}$ | $s_{5,2}$ | ... | $s_{N_{OS}-2,2}$ | $s_{N_{OS}-1,2}$ |
| SC#3 | $s_{0,3}$ | $s_{1,3}$ | $s_{2,3}$ | $s_{3,3}$ | $s_{4,3}$ | $s_{5,3}$ | ... | $s_{N_{OS}-2,3}$ | $s_{N_{OS}-1,3}$ |
| SC#4 | $s_{0,4}$ | $s_{1,4}$ | $s_{2,4}$ | $s_{3,4}$ | $s_{4,4}$ | $s_{5,4}$ | ... | $s_{N_{OS}-2,4}$ | $s_{N_{OS}-1,4}$ |
| SC#5 | $s_{0,5}$ | $s_{1,5}$ | $s_{2,5}$ | $s_{3,5}$ | $s_{4,5}$ | $s_{5,5}$ | ... | $s_{N_{OS}-2,5}$ | $s_{N_{OS}-1,5}$ |
| ... | ... | ... | ... | ... | ... | ... | ⋱ | ... | ... |
| SC#($N_{SC}$-2) | $s_{0,N_{SC}-2}$ | $s_{1,N_{SC}-2}$ | $s_{2,N_{SC}-2}$ | $s_{3,N_{SC}-2}$ | $s_{4,N_{SC}-2}$ | $s_{5,N_{SC}-2}$ | ... | $s_{N_{OS}-2,N_{SC}-2}$ | $s_{N_{OS}-1,N_{SC}-2}$ |
| SC#($N_{SC}$-1) | $s_{0,N_{SC}-1}$ | $s_{1,N_{SC}-1}$ | $s_{2,N_{SC}-1}$ | $s_{3,N_{SC}-1}$ | $s_{4,N_{SC}-1}$ | $s_{5,N_{SC}-1}$ | ... | $s_{N_{OS}-2,N_{SC}-1}$ | $s_{N_{OS}-1,N_{SC}-1}$ |

|  | OS#0 | OS#1 | ... | OS#($N_{OS}$-1) |
|---|---|---|---|---|
| SC#0 | UN-ALLOCATED | $s_{N_{SC}-2}$ | ... | $s_{(N_{OS}-1)N_{SC}-2}$ |
| SC#1 | UN-ALLOCATED | $s_{N_{SC}-1}$ | ... | $s_{(N_{OS}-1)N_{SC}-1}$ |
| SC#2 | $s_0$ | $s_{N_{SC}}$ | ... | $s_{(N_{OS}-1)N_{SC}}$ |
| SC#3 | $s_1$ | $s_{N_{SC}+1}$ | ... | $s_{(N_{OS}-1)N_{SC}+1}$ |
| ⋮ | ⋮ | ⋮ | ⋱ | ⋮ |
| SC#($N_{SC}$-1) | $s_{N_{SC}-3}$ | $s_{2N_{SC}-3}$ | ... | $s_{N_{OS}N_{SC}-3}$ |

US 10,958,496 B1

TRANSMITTER, CONTROL CIRCUIT, RECORDING MEDIUM, AND SUBCARRIER MAPPING METHOD

FIELD

The present invention relates to a transmitter, a control circuit, a recording medium, and a subcarrier mapping method that apply differential space-time block coding to orthogonal frequency division multiplexing

BACKGROUND

In the field of wireless communication, transmission diversity is employed in some cases as a technique for improving performance against fading that occurs on a transmission line. The transmission diversity includes a scheme called space-time block coding (STBC) that performs space-time block coding on a transmission sequence, generates a plurality of orthogonal sequences, and transmits each of the plurality of sequences generated from a different antenna.

There has also been studied differential space-time block coding (DSTBC) combining STBC and differential coding that does not require estimation of the transmission line by a receiver. Patent Literature 1 discloses a technique in which differential space-time block coding is applied to orthogonal frequency division multiplexing (OFDM).

CITATION LIST

Patent Literature

Patent Literature 1: International Publication WO 2013/128983

SUMMARY

Technical Problem

However, in differential space-time block coding, information is carried on a difference between two blocks, so that, in the technique described in Patent Literature 1, no information is carried on a start symbol which is a first symbol. Accordingly, the transmission rate decreases by the amount corresponding to the start symbol. When differential space-time block coding is applied to OFDM, the number of start symbols is equal to the product of the number of subcarriers and the number of antennas. Therefore, as the number of subcarriers and the number of antennas increase, the number of symbols carrying no information increases, and the decrease in the transmission rate also increases.

The present invention has been made in view of the above, and an object of the present invention is to provide a transmitter and a subcarrier mapping method that can improve the transmission rate when differential block coding is applied to orthogonal frequency division multiplexing.

Solution to Problem

In order to solve the above problem and achieve the object, a transmitter according to an aspect of the present invention includes: a first mapping unit to allocate modulation symbols to orthogonal frequency division multiplexing subcarriers; a first differential block coding unit to perform differential block coding on a part of the modulation symbols allocated; a second differential block coding unit to perform, by using output of the first differential block coding unit as a start symbol, differential block coding on a remaining modulation symbol excluding the part of the modulation symbols subjected to differential block coding by the first differential block coding unit; and a second mapping unit to convert output of the second differential block coding unit into a transmit signal that is transmitted from a plurality of antennas.

Advantageous Effects of Invention

The transmitter according to the present invention has an effect of being able to prevent or reduce a decrease in the transmission rate.

BRIEF DESCRIPTION OF DRAWINGS

FIG. 2 is a diagram illustrating a symbol sequence allocated by a first mapping unit illustrated in FIG. 1.

FIG. 3 is a diagram illustrating the symbol allocation illustrated in FIG. 2 using an OFDM symbol number and a subcarrier number.

FIG. 6 is a diagram illustrating a transmit signal #1 and a transmit signal #2 generated by a second mapping unit illustrated in FIG. 1.

FIG. 9 is a diagram illustrating a modulation symbol sequence allocated by the first mapping unit according to a third embodiment.

DESCRIPTION OF EMBODIMENTS

A transmitter, a control circuit, a recording medium, and a subcarrier mapping method according to embodiments of the present invention will now be described in detail with reference to the drawings. Note that the present invention is not limited to the embodiments.

First Embodiment.

Figure 1:
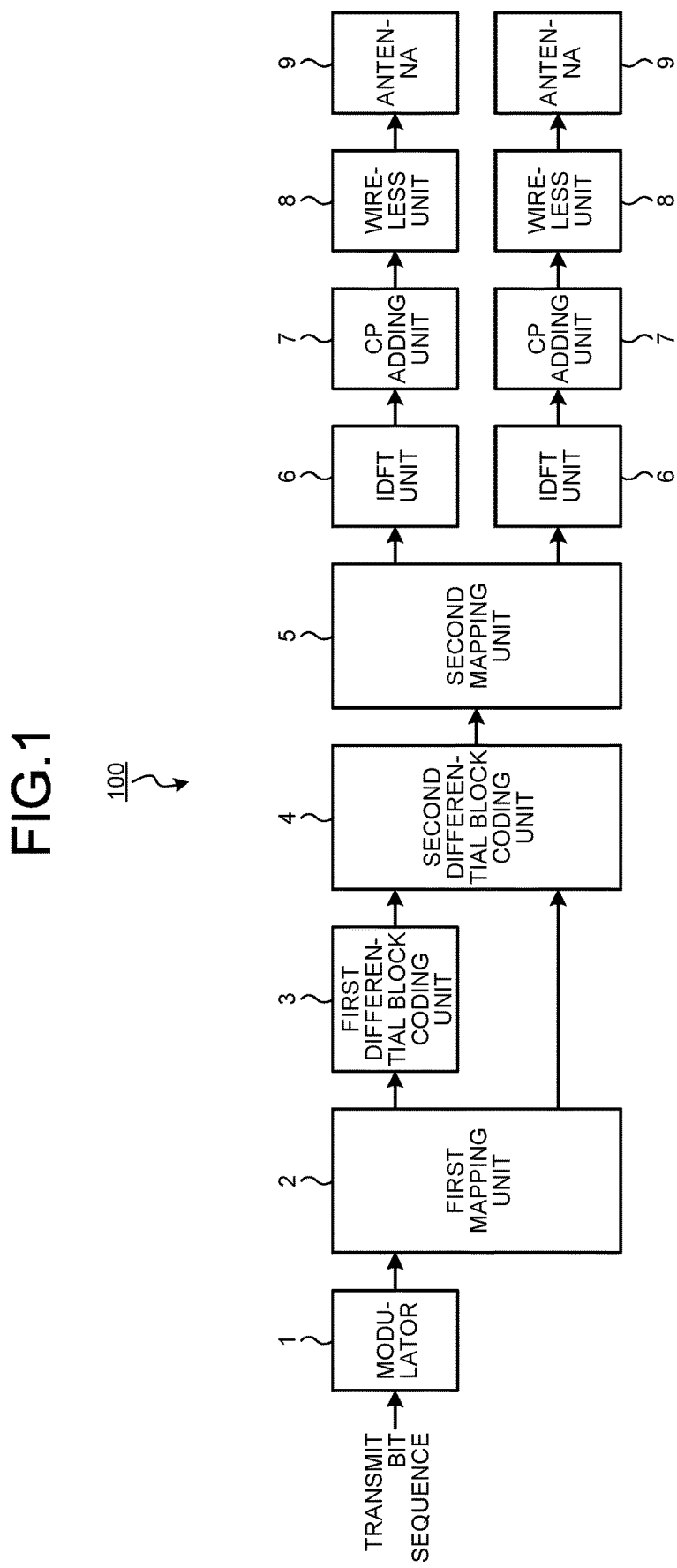
FIG. 1 is a diagram illustrating a configuration of a transmitter according to a first embodiment of the present invention.

FIG. 1 is a diagram illustrating a configuration of a transmitter 100 according to a first embodiment of the present invention. The transmitter 100 illustrated in FIG. 1 includes a modulator 1, a first mapping unit 2, a first differential block coding unit 3, a second differential block coding unit 4, a second mapping unit 5, a plurality of inverse discrete Fourier transform (IDFT) units 6, a plurality of cyclic prefix (CP) adding units 7, a plurality of wireless units 8, and a plurality of antennas 9. The IDFT unit 6, the CP adding unit 7, and the wireless unit 8 are provided corresponding to each of the two antennas 9.

The modulator 1 converts an input transmit bit sequence into modulation symbols that are a complex symbol sequence. The modulator 1 can convert the transmit bit sequence into the modulation symbols using a modulation scheme such as binary phase shift keying (BPSK) or quadrature phase shift keying (QPSK). The modulator 1 outputs the converted modulation symbols to the first mapping unit 2.

The first mapping unit 2 maps the modulation symbols output by the modulator 1 to subcarriers of OFDM symbols that are a data unit that is converted into a time domain signal by the IDFT unit 6 in one IDFT. Specifically, the first mapping unit 2 allocates the symbol sequence input from the modulator 1 to $N_{sc}$ subcarriers of $N_{os}$ OFDM symbols. The input symbol sequence is $(N_{os} \cdot N_{sc} - 2)$ in number.

Figure 2:
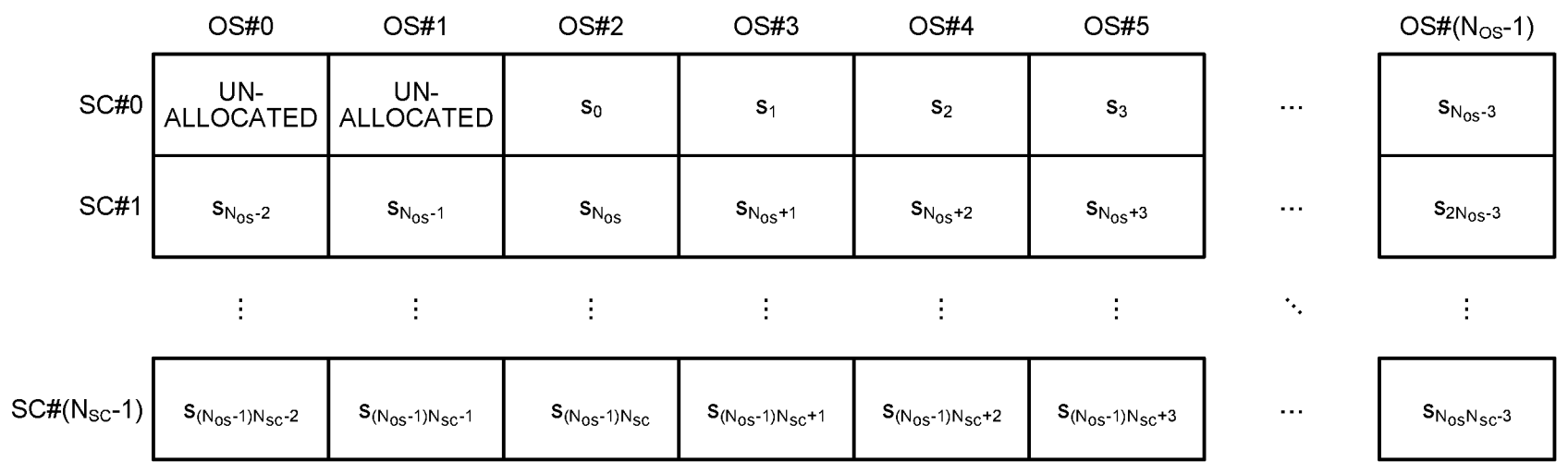

FIG. 2 is a diagram illustrating the symbol sequence allocated by the first mapping unit 2 illustrated in FIG. 1. Here, the input symbol sequence is $s_0, s_1, \ldots s_{NosNsc-3}$. In FIG. 2, OFDM symbols OS #0 to OS # $(N_{os}-1)$ are arranged in the horizontal direction, and subcarriers SC #0 to SC #$(N_{sc}-1)$ are arranged in the vertical direction. No symbol is allocated to the OFDM symbols OS #0 and OS #1 of the subcarrier SC #0. The input symbol sequence is mapped in the order of the OFDM symbols OS #2 to OS #$(N_{os}-1)$ of the subcarrier SC #0, then the OFDM symbols OS #0 to OS #$(N_{os}-1)$ of the subcarrier SC #1 up to the subcarrier SC #$(N_{sc}-1)$ in a similar manner. Note that the above order of mapping is an example, and the mapping need only be performed such that no overlap occurs. Moreover, the position where no symbol is allocated is the same position as the position of a start symbol for the first differential block coding unit 3 described later. The first mapping unit 2 outputs mapped symbols, which are symbols after the mapping, to the first differential block coding unit 3 and the second differential block coding unit 4.

The description refers back to FIG. 1. The first differential block coding unit 3 performs differential block coding on a part of the mapped symbols output from the first mapping unit 2. Specifically, the first differential block coding unit 3 performs differential block coding on the symbols corresponding to the OFDM symbols OS #0 and OS #1 among the mapped symbols allocated by the first mapping unit 2. A block when differential block coding is performed by the first differential block coding unit 3 includes two symbols corresponding to the same subcarrier, that is, two adjacent symbols in the time direction, and differential block coding is performed in the direction of the subcarriers, or the frequency direction.

FIG. 3 is a diagram illustrating the symbol allocation illustrated in FIG. 2 using an OFDM symbol number "x" and a subcarrier number "y". In FIG. 3, when "x" represents the OFDM symbol number and "y" represents the subcarrier number, each symbol allocated by the first mapping unit 2 is represented as "$s_{x,y}$". When each symbol after subjected to differential block coding is represented as "$c_{x,y}$", the differential block coding performed by the first differential block coding unit 3 is expressed by the following Formula (1).

[Formula 1]

$$\begin{bmatrix} C_{0,y} & C_{1,y} \\ -C_{1,y}^* & C_{0,y}^* \end{bmatrix} = \begin{bmatrix} S_{0,y} & S_{1,y} \\ -S_{1,y}^* & S_{x,y}^* \end{bmatrix} \begin{bmatrix} C_{0,y-1} & C_{1,y-1} \\ -C_{1,y-1}^* & C_{0,y-1}^* \end{bmatrix}; \quad (1)$$

$$y = 1, \ldots, N_{SC} - 1$$

Here, "$c_{0,0}$" and "$c_{1,0}$" represent start symbols corresponding to the starting point for differential block coding. The start symbols can be any symbols whose total power equals one. By performing the processing expressed by Formula (1), differentially coded symbols that are symbols after subjected to differential block coding can be generated.

Figure 4:
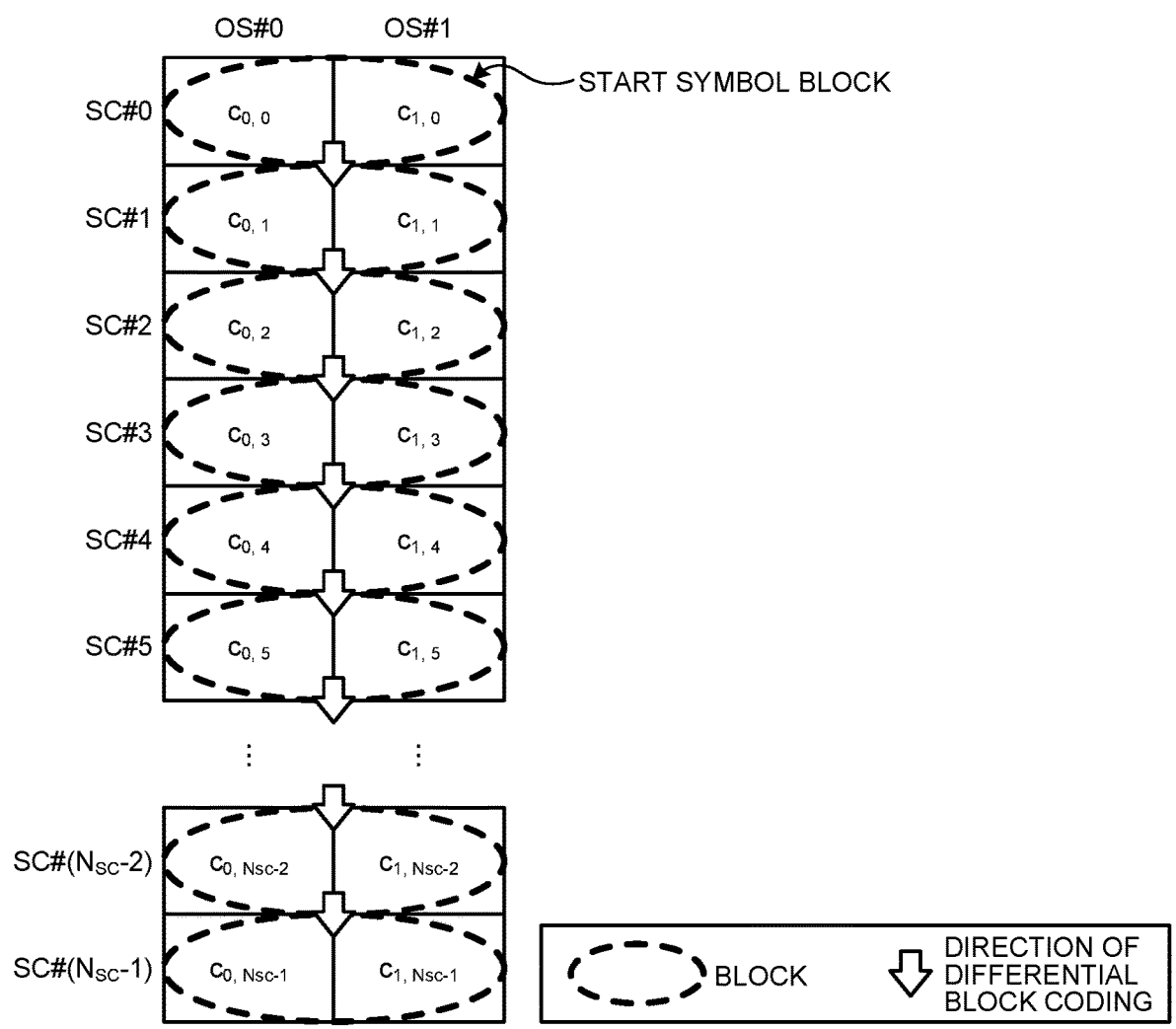
FIG. 4 is a diagram illustrating differentially coded symbols generated by a first differential block coding unit illustrated in FIG. 1.

FIG. 4 is a diagram illustrating the differentially coded symbols generated by the first differential block coding unit 3 illustrated in FIG. 1. In FIG. 4, a dashed ellipse indicates the block that is a processing unit including two symbols, and an arrow indicates the direction of differential block coding performed by the first differential block coding unit 3. As illustrated in FIG. 4, the first differential block coding unit 3 treats two symbols of the same subcarrier, that is, two symbols in the time direction, of the OFDM symbols OS #0 and OS #1 as one block for each subcarrier, and performs differential block coding in the direction of the subcarriers, or the frequency direction. The first differential block coding unit 3 outputs the differentially coded symbols generated after the differential block coding processing to the second differential block coding unit 4.

The description refers back to FIG. 1. The second differential block coding unit 4 performs differential block coding using the mapped symbols allocated by the first mapping unit 2 and the differentially coded symbols output from the first differential block coding unit 3. At this time, the second differential block coding unit 4 uses the symbols corresponding to the OFDM symbols OS #0 and OS #1, which are the differentially coded symbols output from the first differential block coding unit 3, as the start symbols to perform differential block coding on the remaining OFDM symbols OS #2 to OS #$(N_{os}-1)$. The second differential block coding unit 4 performs differential block coding in the frequency direction or the time direction, different from the direction in which the first differential block coding unit 3 performs differential block coding. Specifically, the second differential block coding unit 4 treats two symbols of the same subcarrier, that is, two symbols in the time direction, as one block to perform differential block coding in the direction of the OFDM symbols, or the time direction. The differential block coding performed by the second differential block coding unit 4 is expressed by the following Formula (2).

[Formula 2]

$$\begin{bmatrix} C_{x,y} & C_{x+1,y} \\ -C_{x+1,y}^* & C_{x,y}^* \end{bmatrix} = \begin{bmatrix} S_{x,y} & S_{x+1,y} \\ -S_{x+1,y}^* & S_{x,y}^* \end{bmatrix} \begin{bmatrix} C_{x-2,y} & C_{x-1,y} \\ -C_{x-1,y}^* & C_{x-2,y}^* \end{bmatrix}; \quad (2)$$

$$x = 2, 4, \ldots, N_{OS} - 2;$$

$$y = 0, 1, \ldots, N_{SC} - 1$$

Figure 5:
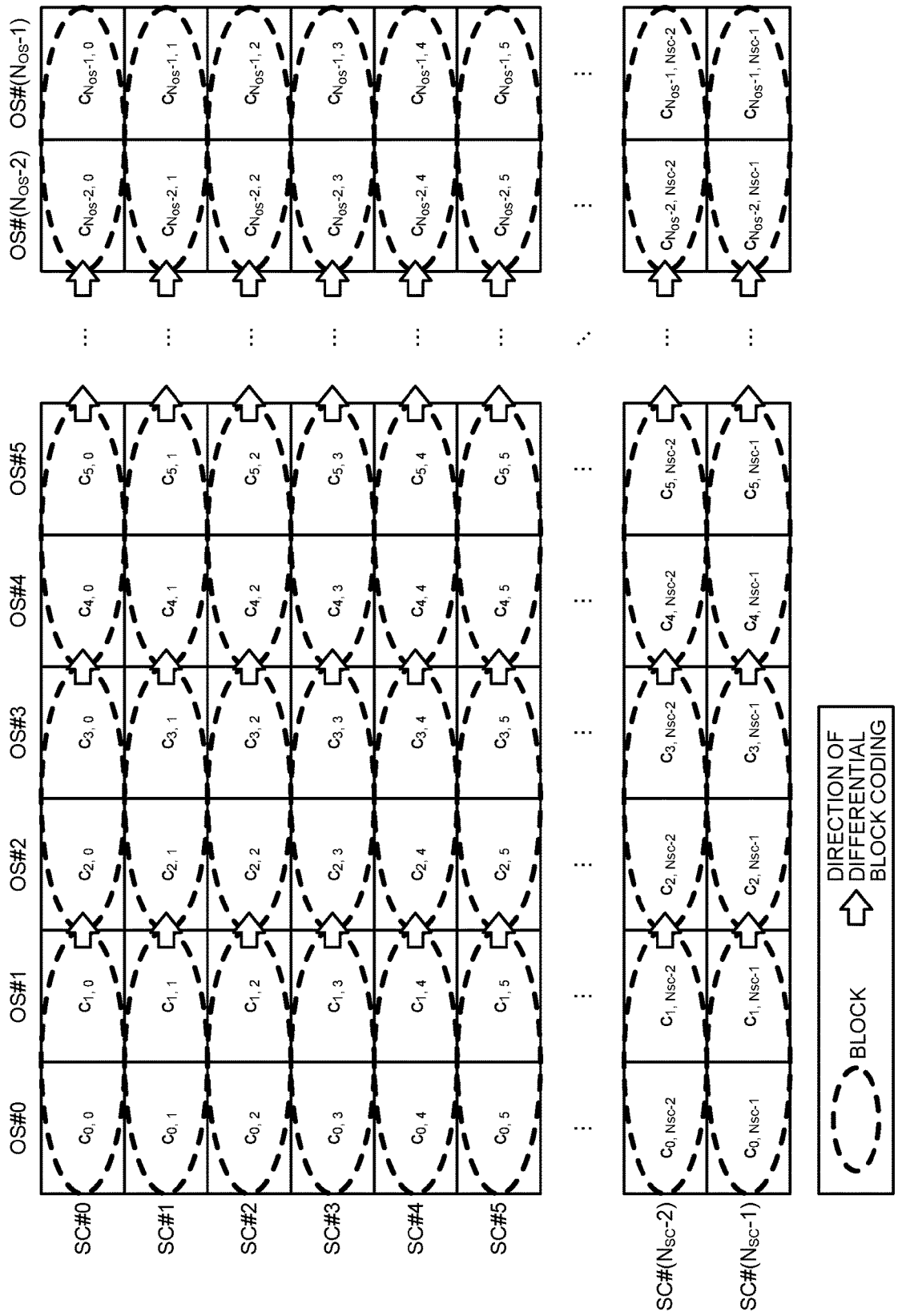
FIG. 5 is a diagram illustrating differentially coded symbols generated by a second differential block coding unit illustrated in FIG. 1.

FIG. 5 is a diagram illustrating differentially coded symbols generated by the second differential block coding unit 4 illustrated in FIG. 1. In FIG. 5, a dashed ellipse indicates the block that is a processing unit including two symbols, and an arrow indicates the direction of differential block coding performed by the second differential block coding unit 4. The second differential block coding unit 4 outputs the differentially coded symbols generated to the second mapping unit 5.

The description refers back to FIG. 1. The second mapping unit 5 generates a signal to be transmitted from each of the two antennas 9 using the differentially coded symbols output from the second differential block coding unit 4.

Figure 6:
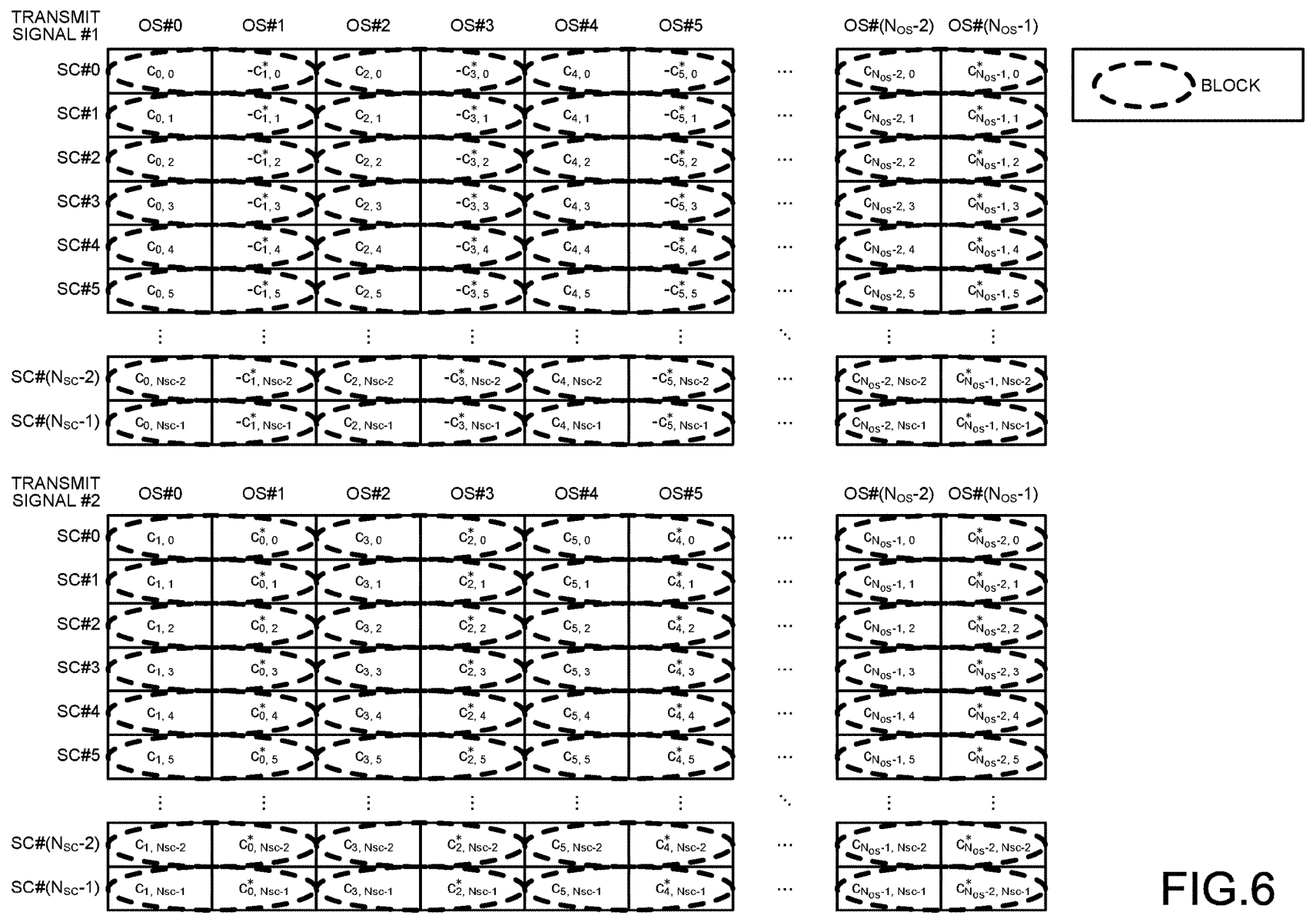

FIG. 6 is a diagram illustrating a transmit signal #1 and a transmit signal #2 generated by the second mapping unit 5 illustrated in FIG. 1. Here, when $(c_0, c_1)$ represents the block in the differential block coding performed by the first differential block coding unit 3 and the second differential block coding unit 4, the second mapping unit 5 generates the transmit signal #1 and the transmit signal #2 that are two signals represented by $(c_0, -c_1^*)$ and $(c_1, c_0^*)$. The second mapping unit 5 outputs the transmit signal #1 and the transmit signal #2 generated to corresponding ones of the two IDFT units 6.

The description refers back to FIG. 1. The IDFT unit 6 converts the transmit signal output from the second mapping unit 5 as a signal in the frequency domain to a signal in the time domain for each OFDM symbol. The IDFT unit 6 outputs the transmit signal obtained after the conversion to the CP adding unit 7. The CP adding unit 7 performs processing of adding a part of a rear end of each OFDM symbol, which is included in the transmit signal output from IDFT unit 6, to a front end. The CP adding unit 7 outputs the transmit signal obtained after the processing to the wireless unit 8. The wireless unit 8 generates a transmit signal to be transmitted from the antenna 9 by performing processing on the baseband transmit signal such as filtering processing that removes an out-of-band signal component, up-conversion processing that performs conversion to a transmit frequency, and amplification processing that adjusts transmit power. The wireless unit 8 transmits the transmit signal obtained after the processing from the antenna 9.

As described above, in the first embodiment, when differential block coding is applied to OFDM, the number of symbols carrying no information can be two unlike a related art that uses, as symbols carrying no information, the start symbols corresponding in number to the number of subcarriers or, in the first embodiment, corresponding in number to a value obtained by multiplying two as the number of antennas by the number of subcarriers. Therefore, the number of symbols carrying no information can be reduced, and the transmission rate can be improved.

Second Embodiment.

In the first embodiment, the first differential block coding unit 3 performs the processing in the direction of the subcarriers, that is, in the frequency direction, and the second differential block coding unit 4 performs the processing in the direction of the OFDM symbols, that is, in the time direction. In contrast, in a second embodiment, the first differential block coding unit 3 performs the processing in the direction of the OFDM symbols, that is, in the time direction, and the second differential block coding unit 4 performs the processing in the direction of the subcarriers, that is, in the frequency direction.

The configuration of the transmitter 100 is similar to that of FIG. 1, and the operations of the first differential block coding unit 3 and the second differential block coding unit 4 are different from those of the first embodiment. Differences from the first embodiment will mainly be described below.

The first differential block coding unit 3 performs differential block coding on the symbols of the subcarrier SC #0 allocated by the first mapping unit 2. The block when differential block coding is performed by the first differential block coding unit 3 includes two symbols corresponding to the same subcarrier, that is, two symbols in the time direction as with the first embodiment, and differential block coding is performed in the direction of the OFDM symbols, or the time direction.

The input to the first differential block coding unit 3 is the modulation symbols illustrated in FIG. 3 as in the first embodiment. When "x" represents the OFDM symbol number, "y" represents the subcarrier number, "$s_{x,y}$" represents each symbol, and "$c_{x,y}$" represents a symbol after subjected to differential block coding, the differential block coding performed by the first differential block coding unit 3 is expressed by the following Formula (3).

[Formula 3]

$$\begin{bmatrix} C_{x,0} & C_{x+1,0} \\ -C_{x+1,0}^* & C_{x,0}^* \end{bmatrix} = \begin{bmatrix} S_{x,0} & S_{x+1,0} \\ -S_{x+1,0}^* & S_{x,0}^* \end{bmatrix} \begin{bmatrix} C_{x-2,0} & C_{x-1,0} \\ -C_{x-1,0}^* & C_{x-2,0}^* \end{bmatrix}; \quad (3)$$
$$x = 2, 4, \ldots, N_{OS} - 2$$

Here, "$c_{0,0}$" and "$c_{1,}$" represent start symbols corresponding to the starting point for differential block coding. The start symbols can be any symbols whose total power equals one. By performing the processing expressed by Formula (3), differentially coded symbols that are symbols after subjected to differential block coding can be generated.

Figure 7:
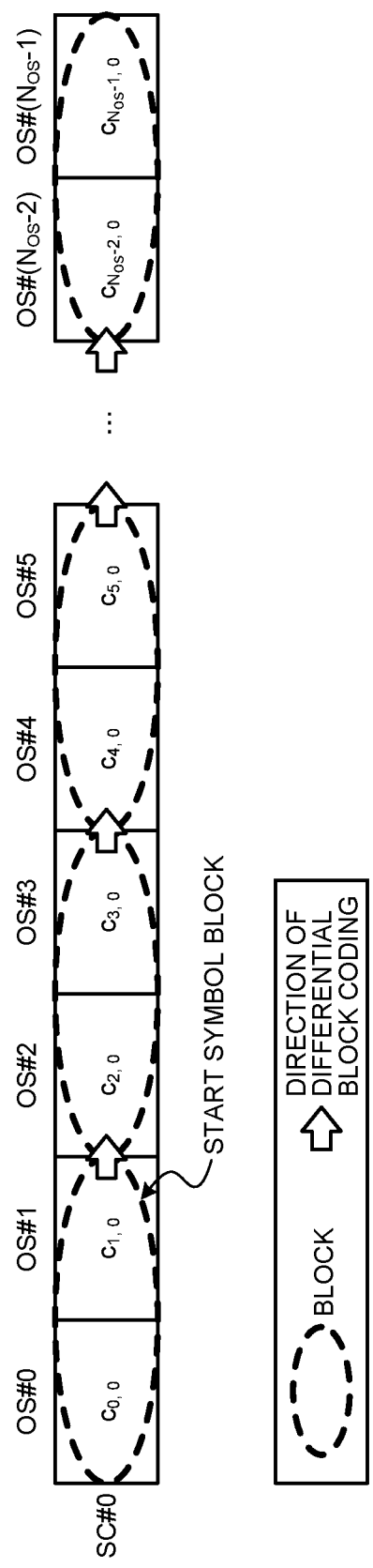
FIG. 7 is a diagram illustrating differentially coded symbols generated by the first differential block coding unit according to a second embodiment.

FIG. 7 is a diagram illustrating the differentially coded symbols generated by the first differential block coding unit 3 according to the second embodiment. In FIG. 7, a dashed ellipse indicates the block that is a processing unit including two symbols, and an arrow indicates the direction of differential block coding performed by the first differential block coding unit 3. As illustrated in FIG. 7, the first differential block coding unit 3 treats two symbols of the subcarrier SC #0, that is, two adjacent symbols in the time direction, as one block to perform differential block coding in the direction of the OFDM symbols, or the time direction. The first differential block coding unit 3 outputs the differentially coded symbols generated after the differential block coding processing to the second differential block coding unit 4.

The second differential block coding unit 4 performs differential block coding on the remaining modulation symbols with each modulation symbol of the subcarrier SC #0 subjected to differential coding by the first differential block coding unit 3 as the start symbol. The second differential block coding unit 4 treats two symbols of the same subcarrier, that is, two symbols in the time direction, as one block to perform differential block coding in the direction of the subcarriers, or the frequency direction. The differential block coding performed by the second differential block coding unit 4 is expressed by the following Formula (4).

[Formula 4]

$$\begin{bmatrix} C_{x,y} & C_{x+1,y} \\ -C^*_{x+1,y} & C^*_{x,y} \end{bmatrix} = \begin{bmatrix} S_{x,y} & S_{x+1,y} \\ -S^*_{x+1,y} & S^*_{x,y} \end{bmatrix} \begin{bmatrix} C_{x,y-1} & C_{x+1,y-1} \\ -C^*_{x+1,y-1} & C^*_{x,y-1} \end{bmatrix}; \quad (4)$$

$$x = 0, 2, \ldots, N_{OS} - 2;$$
$$y = 1, \ldots, N_{SC} - 1$$

Figure 8:
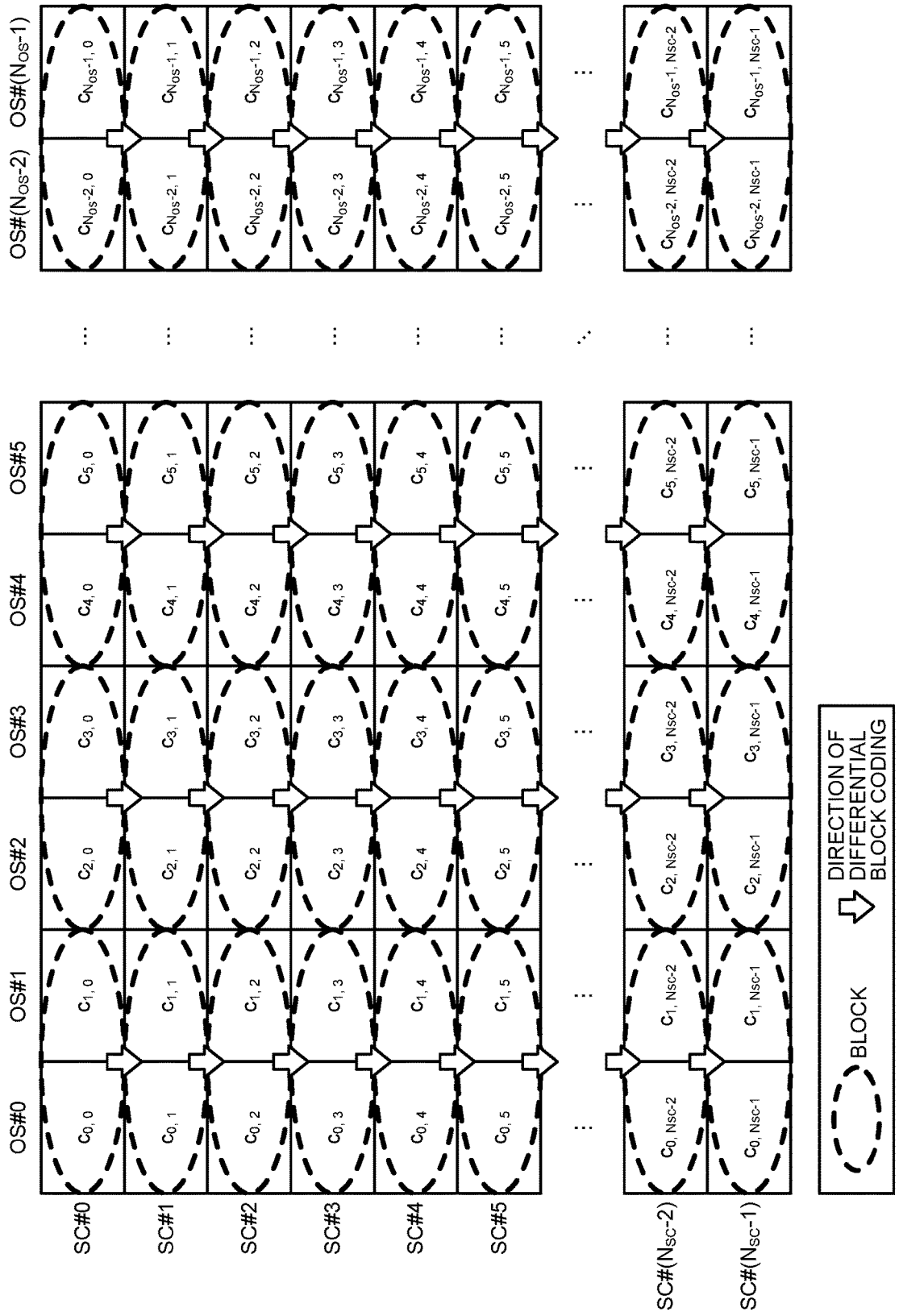
FIG. 8 is a diagram illustrating differentially coded symbols generated by the second differential block coding unit according to the second embodiment.

FIG. 8 is a diagram illustrating differentially coded symbols generated by the second differential block coding unit 4 according to the second embodiment. In FIG. 8, a dashed ellipse indicates the block that is a processing unit including two symbols, and an arrow indicates the direction of differential block coding performed by the second differential block coding unit 4. The second differential block coding unit 4 outputs the differentially coded symbols generated to the second mapping unit 5. The operation of the second mapping unit 5 is similar to that of the first embodiment, where, when the differentially coded symbols illustrated in FIG. 8 are input, the transmit signal #1 and the transmit signal #2 with the symbol allocation illustrated in FIG. 6 are output.

As described above, according to the second embodiment, the first differential block coding unit 3 treats the two adjacent symbols in the time direction as one block to perform differential block coding in the time direction. In this case as well, the second differential block coding unit 4 performs differential block coding in the frequency direction using the output of the first differential block coding unit 3 as the start symbol, so that the number of symbols carrying no information can be two symbols. Therefore, as with the first embodiment, the number of symbols carrying no information can be reduced, and the transmission rate can be improved.

Third Embodiment.

In the first embodiment, the block that is the coding unit in differential block coding includes two adjacent symbols in the time direction, whereas in a third embodiment, the block includes two adjacent symbols in the frequency direction.

The configuration of the transmitter 100 is similar to that of FIG. 1, and the operations of the first mapping unit 2, the first differential block coding unit 3, and the second differential block coding unit 4 are different from those of the first embodiment. Differences from the first embodiment will mainly be described below.

The first mapping unit 2 maps the modulation symbol sequence input from the modulator 1 to the subcarriers of the OFDM symbols. Specifically, the first mapping unit 2 allocates the modulation symbol sequence input from the modulator 1 to the $N_{sc}$ subcarriers of the $N_{os}$ OFDM symbols. The input modulation symbol sequence is ($N_{os} \cdot N_{sc} - 2$) in number.

FIG. 9 is a diagram illustrating the modulation symbol sequence allocated by the first mapping unit 2 according to the third embodiment. Here, the input symbol sequence is $s_0, s_1, \ldots s_{N_{os}N_{sc}-3}$. In FIG. 9, the OFDM symbols OS #0 to OS #($N_{os}-1$) are arranged in the horizontal direction, and the subcarriers SC #0 to SC #($N_{sc}-1$) are arranged in the vertical direction. No symbol is allocated to the OFDM symbol OS #0 of the subcarriers SC #0 and SC #1. The input symbol sequence is mapped in the order of the subcarriers SC #2 to SC #($N_{sc}-1$) of the OFDM symbol OS #0, then the subcarriers SC #0 to SC #($N_{sc}-1$) of the OFDM symbol OS #1 up to the OFDM symbol OS #($N_{os}-1$) in a similar manner. Note that the above order of mapping is an example, and the mapping need only be performed such that no overlap occurs. Moreover, the position where no symbol is allocated is the same position as the position of a start symbol for the first differential block coding unit 3 described later. The first mapping unit 2 outputs mapped symbols, which are modulation symbols obtained after the mapping, to the first differential block coding unit 3 and the second differential block coding unit 4.

The first differential block coding unit 3 performs differential block coding on a part of the mapped symbols output from the first mapping unit 2. Specifically, the first differential block coding unit 3 performs differential block coding on the symbols corresponding to the OFDM symbol OS #0 among the mapped symbols allocated by the first mapping unit 2. The block when differential block coding is performed by the first differential block coding unit 3 includes two symbols corresponding to the same OFDM symbol, that is, two adjacent symbols in the frequency direction, and differential block coding is performed in the direction of the subcarriers, or the frequency direction.

When "x" represents the OFDM symbol number, "y" represents the subcarrier number, "$s_{x,y}$" represents each symbol allocated by the first mapping unit 2, and "$c_{x,y}$" represents each symbol after subjected to differential block coding, the differential block coding performed by the first differential block coding unit 3 is expressed by the following Formula (5).

[Formula 5]

$$\begin{bmatrix} C_{0,y} & C_{0,y+1} \\ -C^*_{0,y+1} & C^*_{0,y} \end{bmatrix} = \begin{bmatrix} S_{0,y} & S_{0,y+1} \\ -S^*_{0,y+1} & S^*_{0,y} \end{bmatrix} \begin{bmatrix} C_{0,y-2} & C_{0,y-1} \\ -C^*_{0,y-1} & C^*_{0,y-2} \end{bmatrix}; \quad (5)$$

$$x = 2, 4, \ldots, N_{OS} - 2$$

Here, "$c_{0,0}$" and "$c_{0,1}$" represent the start symbols corresponding to the starting point for differential block coding. The start symbols can be any symbols whose total power equals one. By performing the processing expressed by Formula (5), differentially coded symbols that are symbols after subjected to differential block coding can be generated.

Figure 10:
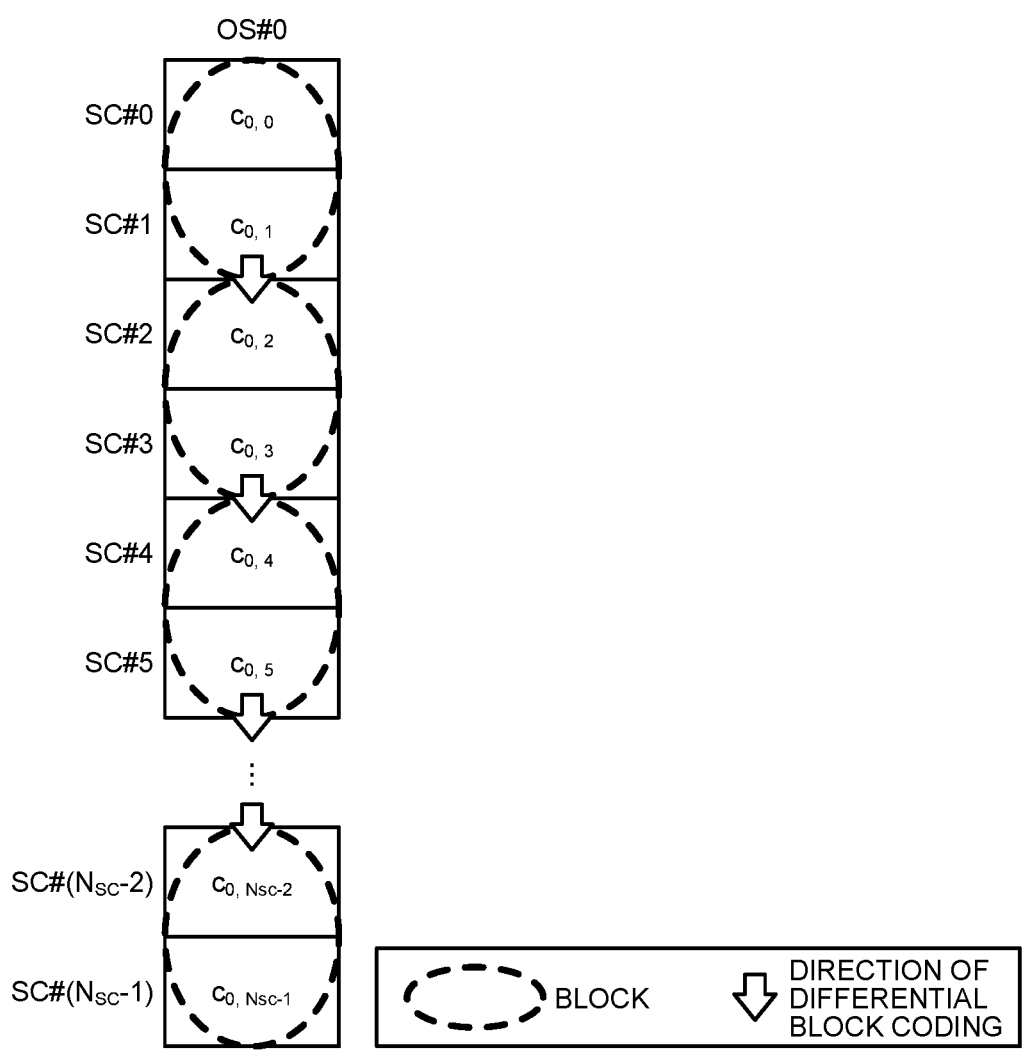
FIG. 10 is a diagram illustrating differentially coded symbols generated by the first differential block coding unit according to the third embodiment.

FIG. 10 is a diagram illustrating the differentially coded symbols generated by the first differential block coding unit 3 according to the third embodiment. In FIG. 10, a dashed ellipse indicates the block that is a processing unit including two symbols, and an arrow indicates the direction of differential block coding performed by the first differential block coding unit 3. As illustrated in FIG. 10, the first differential block coding unit 3 treats two adjacent symbols in the frequency direction corresponding to the OFDM symbol OS #0 as one block, and performs differential block coding in the direction of the subcarriers, or the frequency direction. The first differential block coding unit 3 outputs the differentially coded symbols generated after the differential block coding processing to the second differential block coding unit 4.

The second differential block coding unit 4 performs differential block coding using the mapped symbols allocated by the first mapping unit 2 and the differentially coded symbols output from the first differential block coding unit 3. At this time, the second differential block coding unit 4 uses the symbols of the OFDM symbol OS #0, which are the differentially coded symbols output from the first differential block coding unit 3, as the start symbols to perform differential block coding on the remaining OFDM symbols OS #1 to OS #($N_{os}-1$). The second differential block coding unit 4 performs differential block coding in the frequency direction or the time direction, different from the direction in which the first differential block coding unit 3 performs differential block coding. Specifically, the second differential block coding unit 4 treats two adjacent symbols corresponding to the same OFDM symbol, that is, two adjacent symbols in the frequency direction, as one block to perform differential block coding in the direction of the OFDM symbols, or the time direction. The differential block coding performed by the second differential block coding unit 4 is expressed by the following Formula (6).

[Formula 6]

$$\begin{bmatrix} C_{x,y} & C_{x,y+1} \\ -C^*_{x,y+1} & C^*_{x,y} \end{bmatrix} = \begin{bmatrix} S_{x,y} & S_{x,y+1} \\ -S^*_{x,y+1} & S^*_{x,y} \end{bmatrix} \begin{bmatrix} C_{x-1,y} & C_{x-1,y+1} \\ -C^*_{x-1,y+1} & C^*_{x-1,y} \end{bmatrix}; \quad (6)$$

$$x = 1, 2, \ldots, N_{OS};$$
$$y = 0, 2, \ldots, N_{SC} - 2$$

Figure 11:
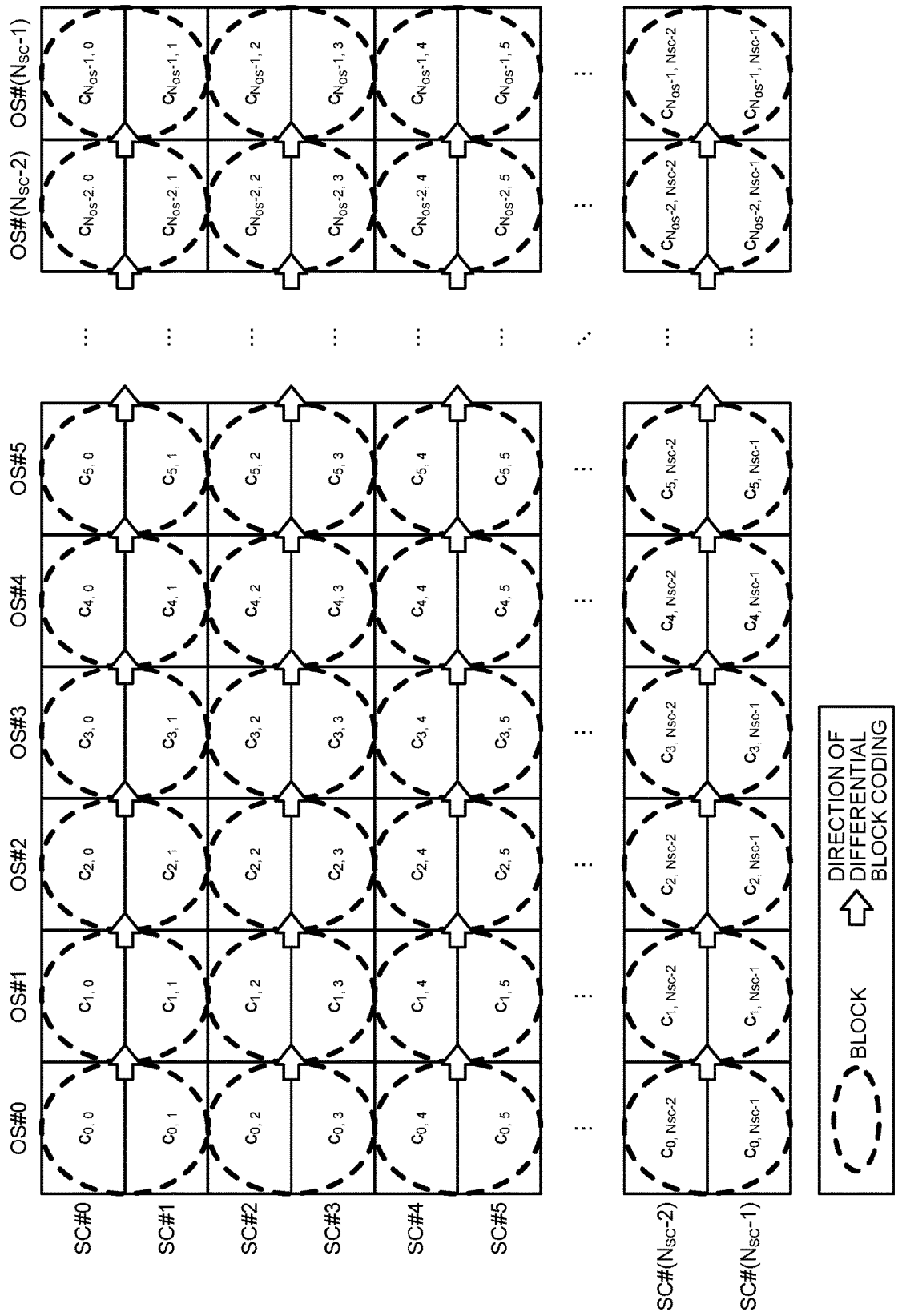
FIG. 11 is a diagram illustrating differentially coded symbols generated by the second differential block coding unit according to the third embodiment.

FIG. 11 is a diagram illustrating differentially coded symbols generated by the second differential block coding unit 4 according to the third embodiment. In FIG. 11, a dashed ellipse indicates the block that is a processing unit including two symbols, and an arrow indicates the direction of differential block coding performed by the second differential block coding unit 4. The second differential block coding unit 4 outputs the differentially coded symbols generated to the second mapping unit 5.

The second mapping unit 5 generates a signal to be transmitted from each of the two antennas 9 using the differentially coded symbols output from the second differential block coding unit 4.

Figure 12:
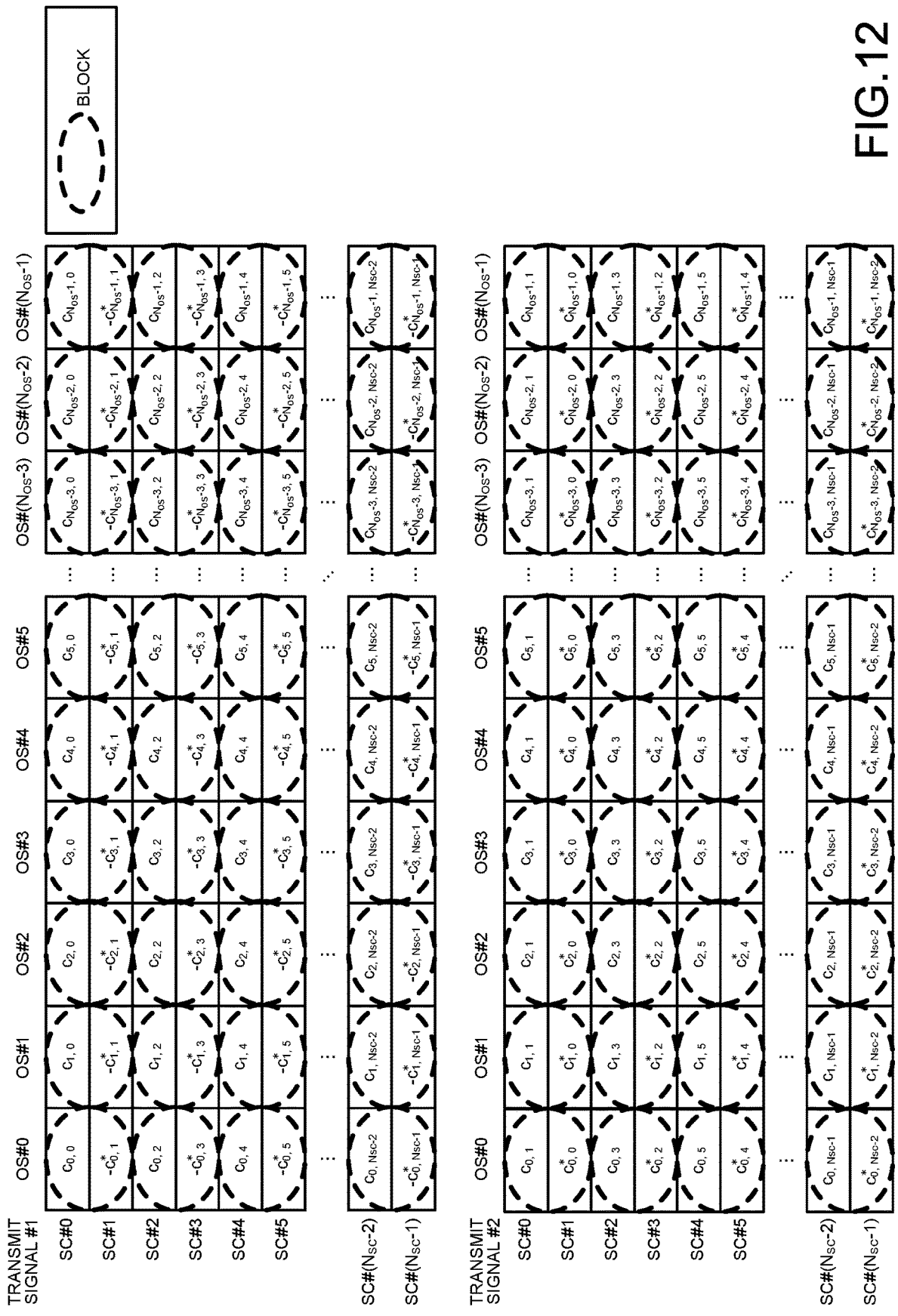
FIG. 12 is a diagram illustrating a transmit signal #1 and a transmit signal #2 generated by the second mapping unit according to the third embodiment.

FIG. 12 is a diagram illustrating a transmit signal #1 and a transmit signal #2 generated by the second mapping unit 5 according to the third embodiment. Here, when ($c_0$, $c_1$) represents the block in the differential block coding performed by the first differential block coding unit 3 and the second differential block coding unit 4, the second mapping unit 5 generates the transmit signal #1 and the transmit signal #2 that are two signals represented by ($c_0$, $-c_1^*$) and ($c_1$, $c_0^*$). The second mapping unit 5 outputs the transmit signal #1 and the transmit signal #2 generated to corresponding ones of the two IDFT units 6.

As described above, according to the third embodiment, the first differential block coding unit 3 and the second differential block coding unit 4 sets two adjacent symbols in the frequency direction as the block that is the coding unit in differential block coding. In this case as well, the first differential block coding unit 3 performs differential block coding on a part of the modulation symbols, and the second differential block coding unit 4 performs differential block coding on the remaining modulation symbols excluding the modulation symbols subjected to differential block coding by the first differential block coding unit 3 by using the output of the first differential block coding unit 3 as the start symbol, whereby the symbols carrying no information can be two symbols. Therefore, the number of symbols carrying no information can be reduced, and the transmission rate can be improved.

Fourth Embodiment.

In the third embodiment, the first differential block coding unit 3 performs the processing in the direction of the subcarriers, that is, in the frequency direction, and the second differential block coding unit 4 performs the processing in the direction of the OFDM symbols, that is, in the time direction. In contrast, in a fourth embodiment, the first differential block coding unit 3 performs the processing in the direction of the OFDM symbols, that is, in the time direction, and the second differential block coding unit 4 performs the processing in the direction of the subcarriers, that is, in the frequency direction.

The configuration of the transmitter 100 is similar to that of FIG. 1, and the operations of the first differential block coding unit 3 and the second differential block coding unit 4 are different from those of the third embodiment. Differences from the third embodiment will mainly be described below.

The first differential block coding unit 3 performs differential block coding on the symbols of the subcarriers SC #0 and SC #1 allocated by the first mapping unit 2. The block when differential block coding is performed by the first differential block coding unit 3 includes two symbols corresponding to the same OFDM symbol, that is, two symbols in the frequency direction as with the third embodiment, and differential block coding is performed in the direction of the OFDM symbols, or the time direction.

The input to the first differential block coding unit 3 is the modulation symbols illustrated in FIG. 3. When "x" represents the OFDM symbol number, "y" represents the subcarrier number, "$s_{x,\,y}$" represents each symbol, and "$c_{x,\,y}$" represents a symbol after subjected to differential block coding, the differential block coding performed by the first differential block coding unit 3 is expressed by the following Formula (7).

[Formula 7]

$$\begin{bmatrix} C_{x,0} & C_{x,1} \\ -C^*_{x,1} & C^*_{x,0} \end{bmatrix} = \begin{bmatrix} S_{x,0} & S_{x,1} \\ -S^*_{x,1} & S^*_{x,0} \end{bmatrix} \begin{bmatrix} C_{x-1,0} & C_{x-1,1} \\ -C^*_{x-1,1} & C^*_{x-1,0} \end{bmatrix}; \quad (7)$$

$$x = 1, 2, \ldots, N_{OS} - 1$$

Here, "$c_{0,\,0}$" and "$c_{0,\,1}$" represent the start symbols corresponding to the starting point for differential block coding. The start symbols can be any symbols whose total power equals one. By performing the processing expressed by Formula (7), differentially coded symbols that are symbols after subjected to differential block coding can be generated.

Figure 13:
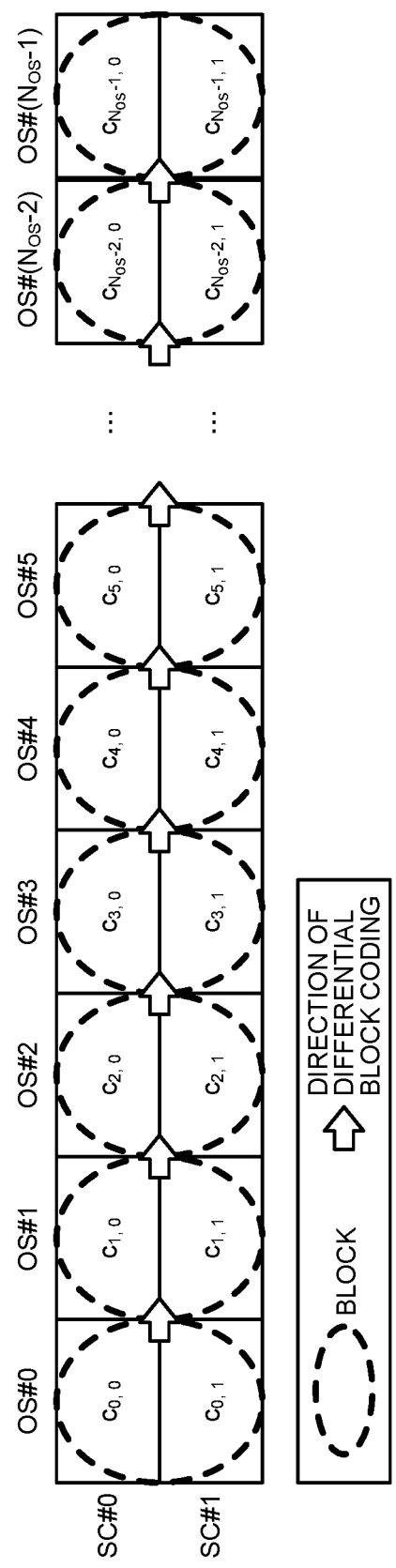
FIG. 13 is a diagram illustrating differentially coded symbols generated by the first differential block coding unit according to a fourth embodiment.

FIG. 13 is a diagram illustrating the differentially coded symbols generated by the first differential block coding unit 3 according to the fourth embodiment. In FIG. 13, a dashed ellipse indicates the block that is a processing unit including two symbols, and an arrow indicates the direction of differential block coding performed by the first differential block coding unit 3. As illustrated in FIG. 13, the first differential block coding unit 3 treats two symbols of the OFDM symbol OS #0, that is, two adjacent symbols in the frequency direction, as one block to perform differential block coding in the direction of the OFDM symbols, or the time direction. The first differential block coding unit 3 outputs the differentially coded symbols generated after the differential block coding processing to the second differential block coding unit 4.

The second differential block coding unit 4 performs differential block coding on the remaining modulation symbols with the modulation symbols of the subcarriers SC #0 and SC #1 subjected to differential coding by the first differential block coding unit 3 as the start symbols. The second differential block coding unit 4 treats two symbols corresponding to the same OFDM symbol, that is, two symbols in the frequency direction, as one block to perform differential block coding in the direction of the subcarriers, or the frequency direction. The differential block coding performed by the second differential block coding unit 4 is expressed by the following Formula (8).

[Formula 8]

$$\begin{bmatrix} C_{x,y} & C_{x,y+1} \\ -C^*_{x,y+1} & C^*_{x,y} \end{bmatrix} = \begin{bmatrix} S_{x,y} & S_{x,y+1} \\ -S^*_{x,y+1} & S^*_{x,y} \end{bmatrix} \begin{bmatrix} C_{x,y-2} & C_{x,y-1} \\ -C^*_{x,y-1} & C^*_{x,y-2} \end{bmatrix};$$ (8)
$$x = 0, 1, \ldots, N_{OS} - 1;$$
$$y = 2, 4, \ldots, N_{SC} - 2$$

Figure 14:
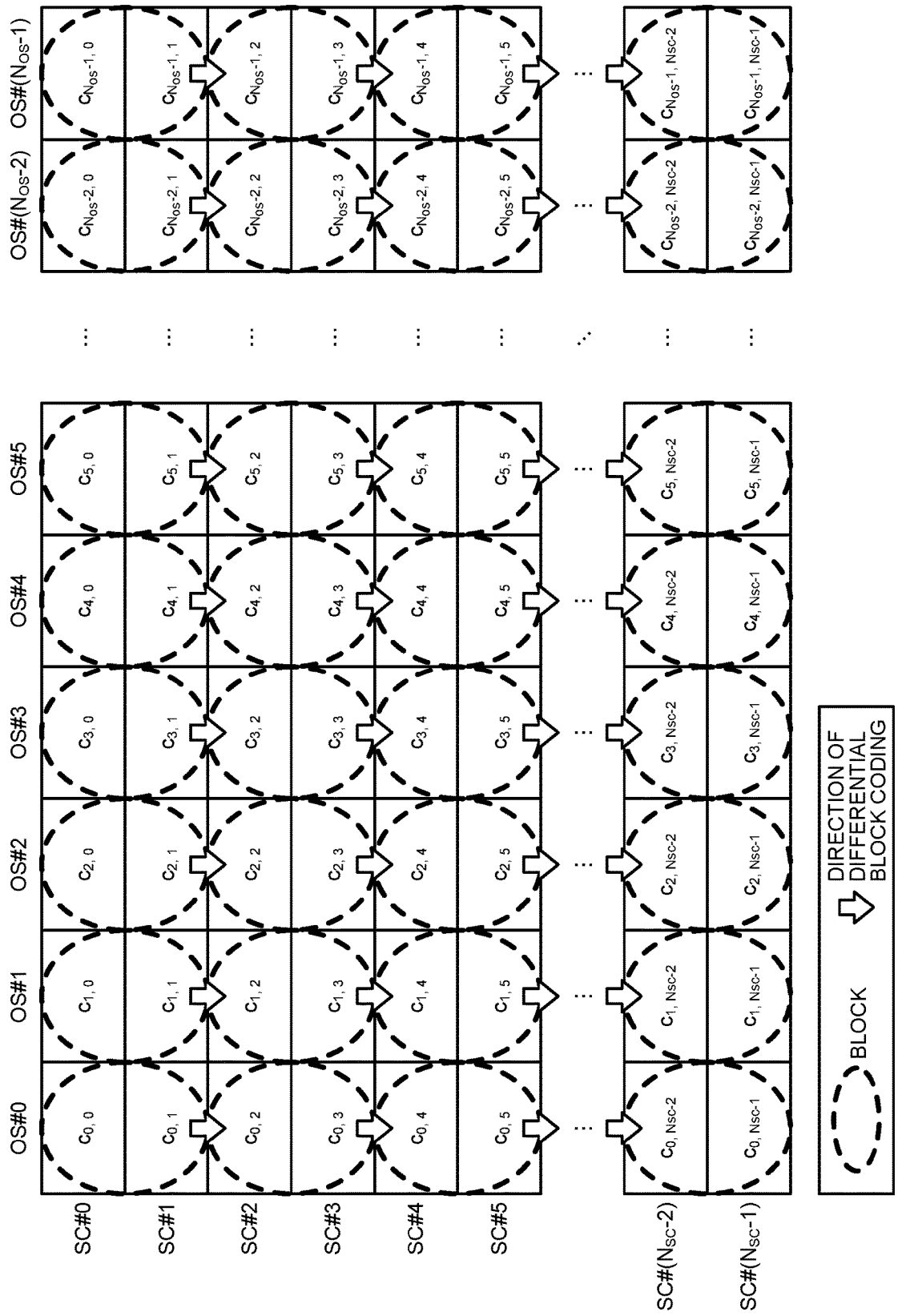
FIG. 14 is a diagram illustrating differentially coded symbols generated by the second differential block coding unit according to the fourth embodiment.

FIG. 14 is a diagram illustrating differentially coded symbols generated by the second differential block coding unit 4 according to the fourth embodiment. In FIG. 14, a dashed ellipse indicates the block that is a processing unit including two symbols, and an arrow indicates the direction of differential block coding performed by the second differential block coding unit 4. The second differential block coding unit 4 outputs the differentially coded symbols generated to the second mapping unit 5. The operation of the second mapping unit 5 is similar to that of the third embodiment, where, when the differentially coded symbols illustrated in FIG. 14 are input, the transmit signal #1 and the transmit signal #2 with the symbol allocation illustrated in FIG. 12 are output.

As described above, according to the fourth embodiment, the first differential block coding unit 3 treats two adjacent symbols in the frequency direction as one block to perform differential block coding in the time direction. In this case as well, the second differential block coding unit 4 performs differential block coding in the frequency direction using the output of the first differential block coding unit 3 as the start symbol, so that the number of symbols carrying no information can be two symbols. Therefore, the number of symbols carrying no information can be reduced, and the transmission rate can be improved.

Figure 15:
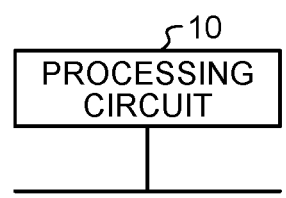
FIG. 15 is a diagram illustrating a processing circuit that implements the functions of the transmitter illustrated in FIG. 1.
Figure 16:
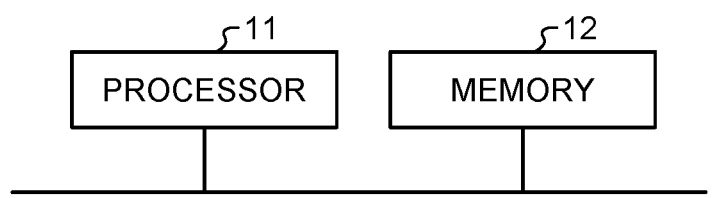
FIG. 16 is a diagram illustrating a hardware configuration for implementing the functions of the transmitter illustrated in FIG. 1 by using software.

Here, a hardware configuration for implementing the functions of the transmitter 100 according to the first to fourth embodiments will be described. FIG. 15 is a diagram illustrating a processing circuit 10 that implements the functions of the transmitter 100 illustrated in FIG. 1. FIG. 16 is a diagram illustrating a hardware configuration for implementing the functions of the transmitter 100 illustrated in FIG. 1 by using software.

The functions included in the transmitter 100 can be implemented using dedicated hardware such as the processing circuit 10 illustrated in FIG. 15. The processing circuit 10 is, for example, a single circuit, a complex circuit, a programmed processor, a parallel-programmed p rocessor, an application specific integrated circuit (ASIC), a field programmable gate array (FPGA), or a combination of those.

The functions included in the transmitter 100 can also be implemented using a processor 11 and a memory 12 illustrated in FIG. 16. The processor 11 is a CPU and is also referred to as a central processor, a processing unit, an arithmetic unit, a microprocessor, a microcomputer, or a digital signal processor (DSP). The memory 12 includes a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disc, a digital versatile disc (DVD), or the like.

The processor 11 reads a computer program stored in the memory 12 and executes the read computer program, whereby the functions of the transmitter 100 illustrated in FIG. 1 can be implemented. The memory 12 is also used as a temporary memory for each processing executed by the processor 11. The functions included in the transmitter 100 may be implemented partially using the processing circuit 10 illustrated in FIG. 15 and partially using the processor 11 and the memory 12 illustrated in FIG. 16.

The configurations illustrated in the above embodiments merely illustrate examples of the content of the present invention, and can thus be combined with another known technique or partially omitted and/or modified without departing from the scope of the present invention.

Reference Signs List

1 modulator; 2 first mapping unit; 3 first differential block coding unit; 4 second differential block coding unit; 5 second mapping unit; 6 IDFT unit; 7 CP adding unit; 8 wireless unit; 9 antenna; 10 processing circuit; 11 processor; 12 memory; 100 transmitter; OS OFDM symbol; SC subcarrier.

The invention claimed is:

1. A transmitter comprising:
   a first mapper to allocate modulation symbols to orthogonal frequency division multiplexing subcarriers;
   a first differential block coder to perform differential block coding on a part of the modulation symbols allocated;
   a second differential block coder to perform, by using output of the first differential block coder as a start symbol, differential block coding on a remaining modulation symbol excluding the part of the modulation symbols subjected to differential block coding by the first differential block coder; and
   a second mapper to convert output of the second differential block coder into a transmit signal that is transmitted from a plurality of antennas.

2. The transmitter according to claim 1, wherein the first mapper does not allocate a symbol to a position corresponding to a start symbol for the first differential block coder.

3. The transmitter according to claim 1, wherein the first differential block coder treats two adjacent symbols in a time direction as one block and performs differential block coding in a frequency direction.

4. The transmitter according to claim 1, wherein the first differential block coder treats two adjacent symbols in a time direction as one block and performs differential block coding in the time direction.

5. The transmitter according to claim 1, wherein the first differential block coder treats two adjacent symbols in a frequency direction as one block and performs differential block coding in a time direction.

6. The transmitter according to claim 1, wherein the first differential block coder treats two adjacent symbols in a frequency direction as one block and performs differential block coding in the frequency direction.

7. The transmitter according to claim 1, wherein the second differential block coder uses a differentially coded symbol generated by the first differential block coder as a start symbol, and performs differential block coding in a direction that is either of the frequency direction and the time direction and is different from a direction in which the first differential block coder performs differential block coding.

8. A subcarrier mapping method comprising:
allocating modulation symbols to orthogonal frequency division multiplexing subcarriers;
performing differential block coding on a part of the modulation symbols allocated and generating a first differentially blocked symbol;
performing, by using the first differentially blocked symbol as a start symbol, differential block coding on a remaining modulation symbol excluding the part of the modulation symbols used to generate the first differentially blocked symbol, and generating a second differentially blocked symbol; and
converting the second differentially blocked symbol into a signal that is transmitted from a plurality of antennas.

9. A control circuit for controlling a transmitter, the control circuit causing the transmitter to perform:
allocating modulation symbols to orthogonal frequency division multiplexing subcarriers;
performing differential block coding on a part of the modulation symbols allocated and generating a first differentially blocked symbol;
performing, by using the first differentially blocked symbol as a start symbol, differential block coding on a remaining modulation symbol excluding the part of the modulation symbols used to generate the first differentially blocked symbol, and generating a second differentially blocked symbol; and
converting the second differentially blocked symbol into a signal that is transmitted from a plurality of antennas.

10. A non-transitory recording medium storing therein a program for controlling a transmitter, the program causing the transmitter to execute:
allocating modulation symbols to orthogonal frequency division multiplexing subcarriers;
performing differential block coding on a part of the modulation symbols allocated and generating a first differentially blocked symbol;
performing, by using the first differentially blocked symbol as a start symbol, differential block coding on a remaining modulation symbol excluding the part of the modulation symbols used to generate the first differentially blocked symbol, and generating a second differentially blocked symbol; and
converting the second differentially blocked symbol into a signal that is transmitted from a plurality of antennas.

* * * * *